UNITED STATES PATENT OFFICE.

CHARLES ALFRED MANKAU, OF ST. PETERSBURG, RUSSIA.

SPINEL FIRE-BRICK.

1,075,659.   Specification of Letters Patent.   Patented Oct. 14, 1913.

No Drawing.   Application filed July 5, 1910. Serial No. 570,399.

*To all whom it may concern:*

Be it known that I, CHARLES ALFRED MANKAU, a subject of the Emperor of Russia, and a resident of St. Petersburg, in Russia, have invented new and useful Improvements in Spinel Fire-Bricks, of which the following is a specification.

This invention relates to the manufacture of firebricks and like refractory articles and more particularly to the cementitious or binding material for uniting the particles of the refractory materials of which the bricks are made.

According to my invention I employ as a cementitious or binding material for uniting the particles of refractory material a small proportion of the mineral natural spinel consisting of a combination of oxids of which $MnOAl_2O_3$ is a type. Such a combination of oxids is hereinafter referred to as spinel. The proportion of spinel I employ is from three to six per cent. of that of the refractory material forming the body of the brick, and a brick produced according to my invention thus differs from previously known bricks which were composed of from 40 to 90 per cent. of natural and artificial spinel with an admixture of refractory material.

The refractory materials employed in my improved bricks are those which are well known for the purpose of making refractory bricks, such for example as dolomite, magnesite, and the like.

The refractory materials for the firebrick admixed with spinel are, in carrying this invention into effect, subjected to a white heat temperature by which perfectly cemented firebrick is obtained. I prefer to add a small proportion of bauxite or a mineral of a like nature to corundum to the refractory materials. The firebrick thus obtained may be reground, mixed with tar, pitch or the like and be formed or pressed into crucibles or other articles and be again calcined.

What I claim is:

1. A firebrick composed of refractory materials and a binding material therefor comprising a small percentage of spinel.

2. A firebrick composed of refractory materials and a binding material therefor comprising a small percentage of spinel, the proportion of spinel being from three to six per cent. of that of the refractory materials.

In testimony whereof I have signed my name to this specification in the presence of two subscribing witnesses.

CHARLES ALFRED MANKAU.

Witnesses:
   H. A. LOVIAGUINE,
   A. TSCHERALOFF.